Jan. 8, 1957 K. E. FARR 2,777,089
TELEVISION SCANNING UNIT
Filed July 29, 1953
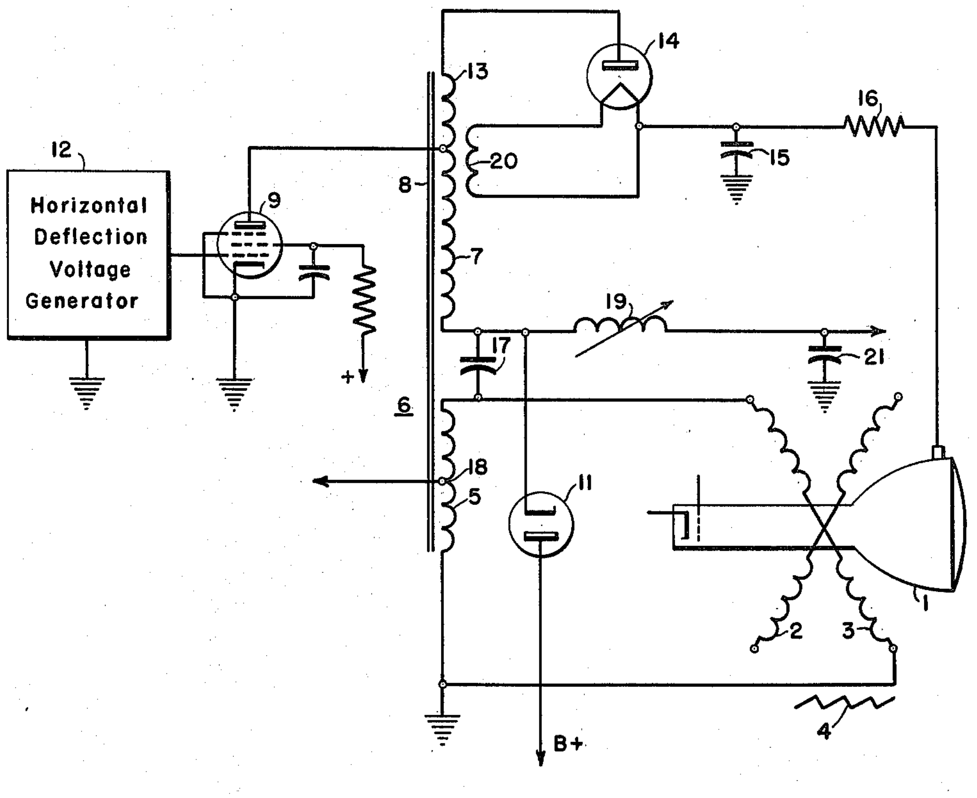
WITNESSES:
John E. Healy
R. G. Brodahl
INVENTOR
Kenneth E. Farr.
BY F. E. Browder
ATTORNEY United States Patent Office 2,777,089

Patented Jan. 8, 1957

2,777,089

TELEVISION SCANNING UNIT

Kenneth E. Farr, Paxinos, Pa., assignor to Westinghouse Electric Corporation, East Pittsburgh, Pa., a corporation of Pennsylvania Application July 29, 1953, Serial No. 371,121

10 Claims. (Cl. 315—27)

My invention relates to electron beam deflection circuits for cathode ray tubes and is particularly adapted to a simplification and improvement of the circuits by which high voltage for the kinescope picture screen and a voltage "boost" for the plate circuits of certain other tubes are derived from the circuit which horizontally deflects the cathode ray beam in television receivers.

Attainment of sufficient image brightness on the picture screens of conventional television receivers requires the impression of several thousand volts and one widely-used source for this voltage comprises a half-wave rectifier fed by a winding positioned on the core of a transformer through which the horizontal deflection generator and amplifier send the saw-tooth current flowing in the horizontal deflection winding. Plate current flowing from the direct current anode supply source of the receiver to the horizontal-deflection amplifier tube traverses a primary winding on the above-mentioned transformer core and its periodic fluctuations, under control of the horizontal deflection generator, generate voltage of suitable wave form in two secondary windings respectively connected to the high voltage rectifier and to the cathode ray deflection windings.

Good picture reproduction requires that the current through the deflection windings shall closely approximate a saw-tooth wave form, and it is a widely current practice to provide in the deflection circuit a so-called "linearity coil" which can be adjusted to correct minor departure of the wave-slopes from linearity. It is likewise necessary to be able to adjust the width of the picture painted by the cathode ray beam on the kinescope picture screen, and another circuit practice is to provide what is known as a "width coil" for this purpose.

Television receiver manufacture is a highly competitive business with large volume production, and reduction in cost of circuit components and the highest efficiency in their use are extremely important. In accordance with one of its aspects, my invention may be considered to comprise the rearrangement of conventional parts of the horizontal deflection circuit of a television receiver in such a way that the linearity coil may be dispensed with while still maintaining satisfactory and efficient functioning of cathode ray deflection. It has been the practice heretofore to feed the plate current to other tubes in the television receiver from the plate-voltage source of the set through the linearity coil which then acted as the series inductor element of a filter isolating such other tubes from voltage pulses present in the horizontal deflection circuit. In my rearrangement of the latter circuit, I have found it possible to so position the width coil that it replaces the linearity coil in performing this filtering function while still continuing to perform its own function of adjusting the picture width on the kinescope screen. As previously employed, the width coil comprised both primary and secondary windings but I have found it possible to dispense with one of these windings thereby effecting a further desirable economy, the automatic gain control (A. G. C.) keying pulse being now obtained from a tap on the secondary winding which supplies saw-tooth current to the horizintal deflection coils.

One object of my invention is accordingly to provide a new and simplified cathode ray deflection circuit for cathode ray tubes.

Another object is to provide a novel and improved circuit for supplying current to the horizontal deflection windings of cathode ray tubes in television picture receivers.

Another object is to provide a circuit for the cathode ray beam deflection windings of a television picture receiver in which a single coil functions both as an adjuster of the picture width and as a filter element through which boost voltages may be supplied to the anodes of tubes in various circuits of the receiver.

Still another object is to provide a simpler and less expensive deflection circuit for cathode ray tubes.

Still another object is to provide a horizontal deflection circuit for television receivers in which the width is adjustable by a coil comprising but a single winding.

Yet another object is to provide a novel and improved way of deriving A. G. C. keying pulses from the horizontal deflection circuit of a television picture receiver.

Other objects of my invention will become apparent upon reading the following description taken in connection with the drawing in which the single figure is a schematic circuit diagram of the horizontal deflection circuits of a television picture receiver embodying my invention.

Referring in detail to the drawing, a television picture receiver has a conventional kinescope 1 enclosing a cathode ray beam and provided with a vertical deflection winding 2 and a horizontal deflection winding 3 of conventional form. For satisfactory operation, the winding 3 must be traversed by a periodic current of substantially saw-tooth wave form, as indicated at 4, in accordance with principles well known in the television art.

Current of the above-mentioned wave form is furnished by the secondary winding 5 of a transformer 6 which is energized by current driven through a primary winding 7 on the common core 8 by a horizontal amplifier tube 9 which may, for example, be of the well known 6BG6 type. Plate current for the tube 9 is supplied to the lower end of winding 7 through a rectifier 11 from the positive pole B+ of a voltage source (not shown) having its negative pole grounded. The upper end of winding 7 is connected to the anode of tube 9 while the cathode of the latter is grounded. A grid voltage of suitable wave form to produce current flow of the saw-tooth or other wave form which is desired in deflection winding 3 is impressed on the control grid of tube 9 by a horizontal deflection voltage generator 12 of type well known in the art. The wave form of the generator 12 may be variable sufficiently to adjust the wave form of the current in deflection winding 3 to the desired degree of linearity.

On the transformer core 8 is another secondary winding 13 having a rectifier 14 at its upper end connected to ground through a capacitor 15. The ungrounded terminal of capacitor 15 is connected to the screen (high voltage anode) of the cathode ray tube 1 through a suitable protective resistor 16. The cathode of rectifier 14 is heated by a third secondary winding 20 on the core 8.

The lower end of winding 7 is connected through a capacitor 17 to the upper end of winding 5 which has its lower end grounded. A suitable tap point 18 on winding 5 is connected to impress keying voltage pulses on an A. G. C. tube of well-known type (not shown). The lower end of primary winding 7 is connected through an adjustable inductor 19, grounded at its outer end through a capacitor 21, and connected to the plate-circuits of any desired tubes in the circuits of the receiver.

The operation of the above-described arrangement will now be discussed. Periodic pulses impressed on the control grid of tube 9 render it non-conductive during the negative portion of their cycle but permit current to flow to it from terminal B+ through rectifier 11 when they reach a sufficiently positive value. A voltage is then impressed by terminal B+ on primary winding 7 setting up a flux in core 8 which induces voltages in windings 5 and 13. The voltage induced in winding 13 is made great enough to charge capacitor 15 through rectifier 14 to the desired voltage for the second anode of cathode ray tube 1.

The voltage thus induced in winding 5 is made of the wave form required to produce a uniformly rising (i. e. saw-tooth) current in deflection winding 3, and this rise continues until the fall to negative values of the voltage impressed by generator 12 on the control grid of amplifier 9 cuts off current flow through the latter and primary winding 7.

When current flow ceases in primary winding 7, there is a large current (corresponding to the top of the saw-tooth wave 4) flowing in deflection winding 3 and a corresponding large magnetic flux in the magnetic deflection yoke which it surrounds on cathode ray tube 1. The winding 3 and its associated leads have a very substantial capacitance to ground, and the self-inductance and capacitance thus existing in deflection winding 3 oscillate, producing the rapidly falling portion of the current wave 4. This current-oscillation soon drops the potential at the upper end of capacitor 17 below the value at the B+ pole and rectifier 11 then becomes conductive, damping out further oscillation and permitting the saw-tooth current wave to complete its period. The voltage wave impressed on the grid of tube 9 by deflection generator 12 then starts another cycle of saw-tooth current in deflection winding 3.

The periodic voltage at the upper end of winding 3 acts through capacitor 17 and width coil 19 to charge capacitor 21 to a voltage somewhat more positive than that of the pole B+ of the plate-voltage source thereby supplying a "boost" voltage to the anodes of tubes connected to the lead at the upper end of capacitor 21. Since the width coil 19 is connected in a channel including the circuit members 17, 5, 21 shunting the deflection coil 3, adjustment of width coil 19 varies the current through the latter and so varies the width of the picture-area scanned by the cathode ray beam on the output screen of kinescope 1.

While I have described my invention in one of its preferred forms, it should be obvious to a person skilled in this art that the embodiments described are subject to wide variations and modifications within the principles of my invention.

I claim as my invention:

1. In a cathode ray beam deflection system a transformer primary winding, a first secondary winding for said transformer connected to send current through a deflection coil of a cathode ray tube, a second secondary winding for said transformer connected to supply current through a rectifier to an anode of said cathode ray tube, a first capacitance connecting one end of said primary winding to one end of said first secondary winding, a connection from the other end of said first secondary winding and the negative pole of a direct current source, a rectifier connecting the positive pole of said source to said one end of said primary winding, means to cause current flow from said source through said primary winding to induce substantially saw-tooth current waves in said deflection coil, and a variable inductor in serial relation with a second capacitance connecting said one end of said primary winding and the negative pole of said source.

2. In a cathode ray beam deflection system a transformer primary winding, a first secondary winding for said transformer connected to send current through a deflection coil of a cathode ray tube, a first capacitance connecting one end of said primary winding to one end of said first secondary winding, a connection from the other end of said first secondary winding and the negative pole of a direct current source, a rectifier connecting the positive pole of said source to said one end of said primary winding, means to cause current flow from said source through said primary winding to induce substantially saw-tooth current waves in said deflection coil, and a variable inductor in serial relation with a second capacitance connecting said one end of said primary winding and the negative pole of said source.

3. In a cathode ray beam deflection system a transformer core, a first winding thereon, a rectifier having the positive pole of a direct current source connected to its anode, a connection through a current control device between an intermediate point on said first winding and the negative pole of said source, a rectifier connected to the other end of said first winding, a second winding on said core connected in serial relation with a deflection coil on a cathode ray tube, a connection from one end of said coil to the negative pole of said source, a first capacitance connecting the other end of said coil to the negative terminal of said rectifier, and a variable inductor in serial relation with a second capacitance connected between said negative terminal and said negative pole.

4. In a cathode ray beam deflection system a transformer core, a first winding thereon, a rectifier having the positive pole of a direct current source connected to its anode, a connection through a current control device between an intermediate point on said first winding and the negative pole of said source, a rectifier connected to the other end of said first winding, a second winding on said core connected in serial relation with a deflection coil on a cathode ray tube, a connection from one end of said coil to the negative pole of said source, a first capacitance connecting the other end of said coil to the negative terminal of said rectifier, and a variable inductor in serial relation with a second capacitance connected between said negative terminal and said negative pole and connections for an A. G. C. circuit between two points on said second winding.

5. In a cathode ray beam deflection system a transformer primary winding having one end connected to ground through a deflection-amplifier tube and its other end connected through a rectifier having its positive terminal connected to the positive pole of a direct current source which has its negative pole grounded, a first secondary winding for said transformer connected in serial relation with a deflection coil for a cathode ray tube, one end of said deflection coil being grounded and its other end being connected through a first capacitance to the negative terminal of said rectifier, means to impress on said amplifier tube periodic pulses causing the flow of substantially saw-tooth current waves through said deflection coil, and a variable inductor in serial relation with a second capacitance connecting said negative terminal to said negative pole.

6. In a cathode ray beam deflection system a transformer primary winding having one end connected to ground through a deflection-amplifier tube and its other end connected through a rectifier having its positive terminal connected to the positive pole of a direct current source which has its negative pole grounded, a first secondary winding for said transformer connected in serial relation with a deflection coil for a cathode ray tube, one end of said deflection coil being grounded and its other end being connected through a first capacitance to the negative terminal of said rectifier, means to impress on said amplifier tube periodic pulses causing the flow of substantially saw-tooth current waves through said deflection coil, and a variable inductor in serial relation with a second capacitance connecting said negative terminal to said negative pole, and a second secondary winding for said transformer connected through a rectifier to an anode of said cathode ray tube.

7. In a cathode ray beam deflection system, a transformer primary winding, a first secondary winding for said transformer connected to send current through a deflection coil of a cathode ray tube, a first capacitance connecting one end of said primary winding to one end of said first secondary winding, a connection from the other end of said first secondary winding and the negative pole of a direct current source, a rectifier connecting the positive pole of said source to said one end of said primary winding, means to cause current flow from said source through said primary winding to induce substantially saw-tooth current waves in said deflection coil, means for deriving A. G. C. pulses from a tap on said first secondary winding, and a variable inductor in serial relation with a second capacitance connecting said one end of said primary winding and the negative pole of said source.

8. In a cathode ray beam deflection system a transformer primary winding, a first secondary winding coupled to said primary winding and connected to send current through a deflection coil on a cathode ray tube, a direct current source connected to send primary current through a rectifier to said primary winding, means to periodically vary said primary current to produce substantially saw-tooth currents in said deflection coil, means for deriving A. G. C. pulses from a tap on said first secondary winding and a circuit comprising a variable inductor and a capacitance in shunt relation with said deflection coil.

9. In a cathode ray beam deflection system a transformer primary winding having one end connected to ground through a deflection-amplifier tube and its other end connected through a rectifier having its positive terminal connected to the positive pole of a direct current source which has its negative pole grounded, a first secondary winding for said transformer connected in serial relation with a deflection coil for a cathode ray tube, one end of said deflection coil being grounded and its other end being connected through a first capacitance to the negative terminal of said rectifier, means to impress on said amplifier periodic pulses causing the flow of substantially saw-tooth current waves through said deflection coil, a variable inductor in serial relation with a second capacitance connecting said negative terminal to said negative pole, and connections for an A. G. C. circuit between two points on said first secondary winding.

10. In a cathode ray beam deflection system a transformer primary winding having one end connected to ground through a deflection-amplifier tube and its other end connected through a rectifier having its positive terminal connected to the positive pole of a direct current source which has its negative pole grounded, a first secondary winding for said transformer connected in serial relation with a deflection coil for a cathode ray tube, one end of said deflection coil being grounded and its other end being connected through a first capacitance to the negative terminal of said rectifier, means to impress on said amplifier tube periodic pulses causing the flow of substantially saw-tooth current waves through said deflection coil, a variable inductor in serial relation with a second capacitance connecting said negative terminal to said negative pole, connections for an A. G. C. circuit between two points on said first secondary winding, and a secondary winding for said transformer connected through a rectifier to an anode of said cathode ray tube.

References Cited in the file of this patent

UNITED STATES PATENTS

| | | |
|---|---|---|
| 2,536,857 | Schade | Jan. 2, 1951 |
| 2,543,305 | Schwarz | Feb. 27, 1951 |
| 2,566,510 | Barco | Sept. 4, 1951 |
| 2,599,798 | Wissell | June 10, 1952 |
| 2,627,051 | Barco | Jan. 27, 1953 |
| 2,627,052 | Helpert et al. | Jan. 27, 1953 |
| 2,708,728 | Hulst | May 17, 1955 |